US000001017H

United States Statutory Invention Registration [19]

[11] Reg. Number: H1017

Hartenstein et al.

[43] Published: Jan. 7, 1992

[54] METHOD AND APPARATUS FOR CONTINUOUS FLOW INJECTION EXTRACTION ANALYSIS

[75] Inventors: Steven D. Hartenstein; Darryl D. Siemer, both of Idaho Falls, Id.

[73] Assignee: The United States of America as represented by the Department of Energy, Washington, D.C.

[21] Appl. No.: 534,897

[22] Filed: Jun. 8, 1990

[51] Int. Cl.[5] ..... G01N 1/18

[52] U.S. Cl. ..... 436/178

*Primary Examiner*—Robert L. Stoll
*Assistant Examiner*—C. Harris
*Attorney, Agent, or Firm*—William R. Moser; Robert J. Fisher; Hugh W. Glenn

[57] ABSTRACT

A method and apparatus for a continuous flow injection batch extraction analysis system is disclosed employing extraction of a component of a first liquid into a second liquid which is a solvent for a component of the first liquid, and is immiscible with the first liquid, and for separating the first liquid from the second liquid subsequent to extraction of the component of the first liquid.

18 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

METHOD AND APPARATUS FOR CONTINUOUS FLOW INJECTION EXTRACTION ANALYSIS

CONTRACTUAL ORIGIN OF THE INVENTION

The U.S. Government has rights in this invention pursuant to Contract No. DE-AC07-84ID12435 between the U.S. Department of Energy and Westinghouse Electric Company.

BACKGROUND OF THE INVENTION

The present invention relates to a method and apparatus for continuous flow injection extraction analysis employing flow injection solvent extraction.

Continuous flow analytical systems in which there is provided a continuous unobstructed carrier stream into which discrete volumes of sample solutions are injected for reaction with the carrier stream are known and described in U.S. Pat. Nos. 4,013,413 and 4,022,575. However, the systems described therein for solvent extraction analysis have drawbacks in that the segmenters and phase separators described therein, typically need frequent maintenance and adjustment for continuing reliable results. Thus the need for such adjustments has been an obstacle in the development of a system capable of continuous, fully automated analytical procedures involving extraction of a liquid sample with an immiscible solvent. The present invention overcomes these problems.

SUMMARY OF THE INVENTION

An object of the present invention is to overcome the deficiencies of flow injection analysis systems known in the prior art. The system of the present invention provides superior mixing of phases which favors more efficient extraction per unit time, and also provides trouble-free phase separation prior to the final detection of the extracted analyte in the lighter phase.

The analytical system according to the invention comprises, an apparatus and method for extracting an analyte component of a first liquid phase into a second liquid phase which is a solvent for the analyte component of the first liquid phase, and which is immiscible with the first liquid phase. The second liquid phase is separated from the first liquid phase subsequent to extraction of the analyte component. The apparatus for carrying out the extraction includes means for supplying a first portion of the first liquid phase into a mixing device at a substantially constant flow rate while the apparatus is in operation. Means are also provided for injecting the second liquid phase into the first portion of the first liquid phase. Then, a second portion of the first liquid phase containing the analyte component is injected into the first portion of the first liquid phase. The mixing device comprises an upper portion and a lower portion. The lower portion includes a mixing chamber having an opening through which the chamber is filled with the first and second liquids and means for vigorously mixing the two liquid phases. The analyte component of the first liquid phase is extracted into the second liquid phase during the vigorous mixing thereof. The upper portion of the apparatus includes a separator for aiding the natural separation of the second liquid phase from the first liquid phase subsequent to the extraction, and an outlet through which the second liquid phase is removed subsequent to separation.

DETAILED DESCRIPTION OF THE PREFERRED EMBODIMENT

Figure 1:
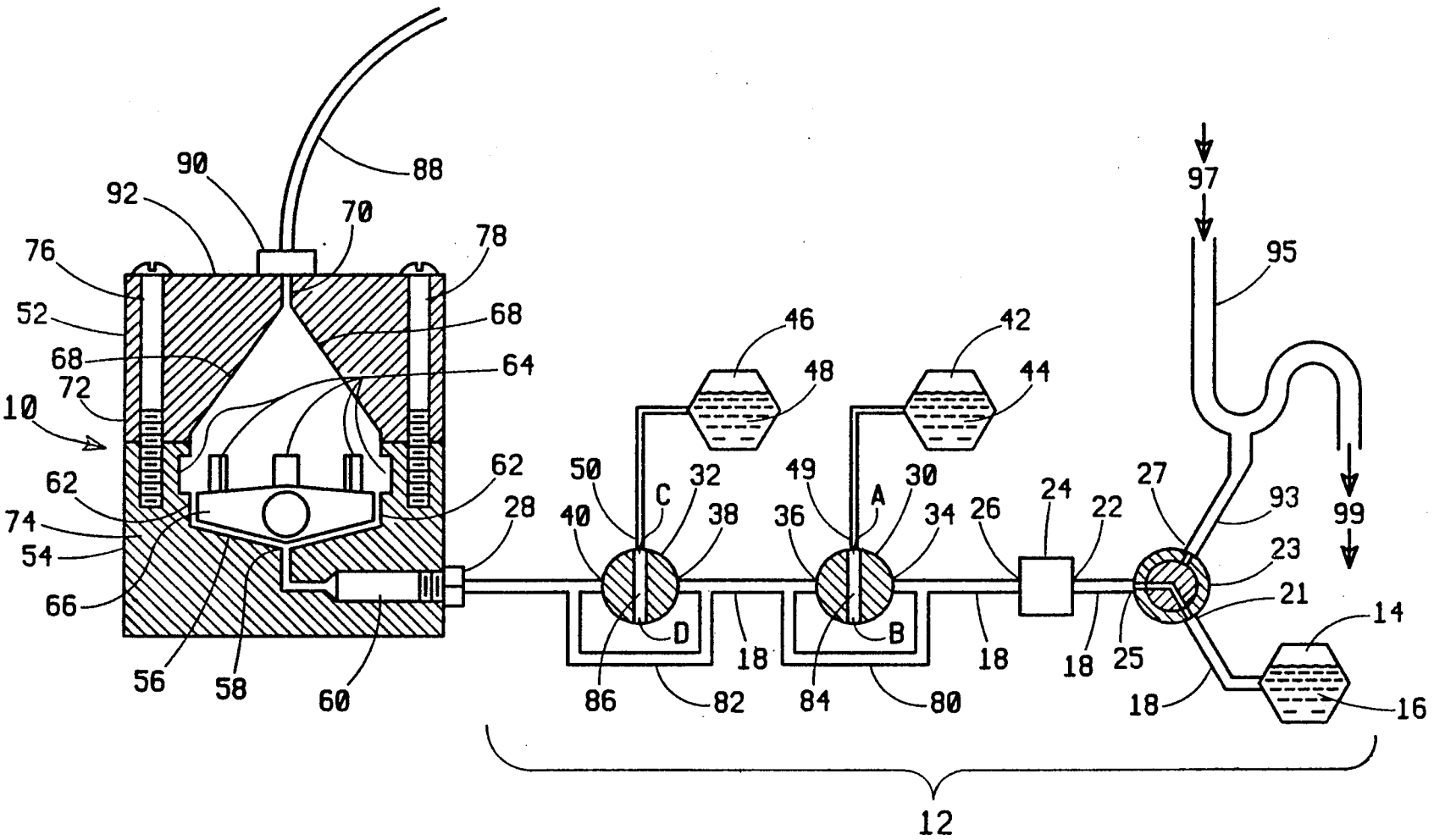
FIG. 1 is a schematic representation of a preferred embodiment of the system and apparatus of the present invention including a cross sectional view of the mixing device associated therewith.

In a preferred embodiment as shown in FIG. 1, a continuous injection batch extraction analysis system 1 is provided which comprises a mixing device 10 and a flow system 12. The flow system 12 comprises a supply source such as a reservoir 14 for containment of a reagent or carrier liquid 16. A supply conduit 18 extends from the outlet 20 of the reservoir 14 to inlet 21 of two position rotary valve 23. Outlet 25 of rotary valve 23 extends to inlet 22 of supply pump 24 through conduit 18 thereby placing the reservoir 14 in fluid communication therewith. The supply conduit 18 further extends from the outlet 26 of the supply pump 24 to the inlet 28 of the mixing device 10.

The first 30 and second 32 valve injectors are placed in series between the supply pump 24 and the mixing chamber 10. The supply conduit 18 is connected to the first valve injector 30 through the inlet 34. The supply conduit 18 then extends from the outlet 36 of the first valve injector 30 to the inlet 38 of the second valve injector 32. The supply conduit 18 is then connected from the outlet 40 of the second valve injector 32 to the inlet 28 of the mixing device 10. A reservoir 42 contains a low density, water-immiscible, solvent/extractant liquid 44 for supply to the first valve injector 30 through the second inlet port 49. A second reservoir 46 contains an aqueous sample liquid 48 for supply to the second valve injector 32 through the second inlet port 50.

The mixing device 10 is comprised of two sections, an upper block 72 and lower block 74, preferably constructed of Teflon® material. Teflon® (polytetrafluoroethylene) was found to be the most suitable material for carrying out the purposes of the present invention due to its low slip resistance and its non-reactive properties with respect to the liquids utilized. Upper block 72 comprises a phase separator 52 and lower block 74 comprises mixing chamber 54. At the bottom 56 of the mixing chamber 54, is an inlet 58. A plug 60 interconnects the inlet 58 with the supply conduit 18 of the flow system 12 to allow the flow of materials into the bottom 56 of the mixing chamber 54.

The side walls 62 of the mixing chamber 54 are machined or otherwise arranged with a plurality of flutes or recesses 64 to aid in the thorough mixing of the liquid materials 16, 44 and 48. A magnetic stirring bar 66 is located proximate to the bottom 56 of the mixing chamber 54. When rotated by electric coils about the mixing chamber 54, the magnetic stirring bar 66 rotates in a rapid fashion as the liquids 16, 44 and 48 enter the mixing chamber 54, thereby vigorously mixing same.

The phase separator 52 of the mixing device 10 is substantially conical in shape having upwardly angled walls 68, which are pointed upwardly toward the outlet 70 of the mixing device 10. In a preferred embodiment, the phase separator 52 and the mixing chamber 54 of the mixing device 10 are sealed together with bolts 76 and 78.

To perform an extraction, the supply pump 24 is activated, thereby pumping a carrier liquid 16 from the reservoir 14 into the mixing chamber 54 via the supply conduit 18. The bypasses 80 and 82 associated with the first 30 and second 32 valve injectors, respectively, allow the carrier liquid 16 to be pumped into the mixing chamber 54 while valve injector 30 is filled with liquid 48 and valve injector 32 is filled with liquid 44.

The first valve injector 30 and second valve injector 32 each includes a first plug chamber 84 and a second 86 plug chamber, respectively, for containment of a small portion of the liquids 44 and 48 from the reservoirs 42 and 46, respectively. When the first valve injector 30 is activated, the first plug chamber 84 is electronically rotated such that port A is in line with inlet 34 and port B is in line with outlet 36. Similarly, when the second valve injector 32 is activated, the second plug chamber 86 is electronically rotated such that port C is in line with inlet 38 and port D is in line with outlet 40. As such, when the first 30 and second 32 valve injectors are activated, the carrier liquid 16 is pumped into the mixing chamber 10 through the first valve injector 30 and the second valve injector 32, thereby carrying plugs of solvent/extractant liquid 44 from the reservoir 42 and the aqueous sample liquid 48 from the reservoir 46 into the mixing chamber 10.

At this point in the process, the combined volume of the carrier liquid 16, the solvent/extractant liquid 44 and the aqueous sample liquid 48 is less than the volume of mixing chamber 54. The magnetic stir bar 66 is then activated, such that it rotates at a very high speed, thereby vigorously mixing the combined volumes of the respective liquids 16, 44 and 48. Simultaneous therewith, the first valve injector 30 and second valve injector 32 are deactivated. The supply pump 24 continues to pump the carrier liquid 16 into the mixing chamber 54 of the mixing device 10 through the inlet 58. Because the first valve injector 30 and the second valve injector 32 are deactivated, the carrier liquid 16 is pumped around the first 30 and second 32 valve injectors through the bypasses 80 and 82, respectively.

Since both the carrier liquid 16 and sample liquid 48 are aqueous, the two liquids 16 and 48 mix completely upon initial contact. However, solvent/extractant liquid 44 is water-immiscible, and therefore does not mix with carrier liquid 16 and sample liquid 48 upon initial contact. Therefore, there are essentially two immiscible liquids within mixing device 10 comprising two liquid phases. The first liquid is in an aqueous phase and comprises the carrier liquid 16 and the sample liquid 48. The second liquid is in an organic non-aqueous phase and comprises solvent/extractant liquid 44.

The stirring bar 66 continues to rotate at a high speed as the first and second immiscible liquids are violently mixed in the mixing chamber 54 of the mixing device 10. The flutes 64 which are cut into the side wall 62 of the mixing chamber 54, assist in breaking up laminar layered flow of the first and second immiscible liquids, and causing the efficient mixing necessary for efficient extraction. As the vigorous mixing continues, the analyte in sample liquid 48 which comprises part of the first liquid phase, is chemically extracted into the solvent-/extractant liquid 44 which comprises the second liquid phase.

The supply pump 24 continues to pump carrier liquid 16 into the mixing chamber 54 of the mixing device 10, thereby eventually raising the combined volume of liquids 16, 44 and 48, in phase separator 52 of mixing device 10. As the level of liquids 16, 44 and 48 increases, the mixing becomes far less efficient and phase separation starts to occur in the conical, upwardly angled walls 68 of the phase separator 52 in mixing device 10. As phase separation begins in the phase separator 52, the solvent/extractant liquid 44 with the analyte moiety of sample liquid 48 extracted therein, is in an organic non-aqueous phase, and is of a lower density than the carrier liquid 16, and therefore rises to the top.

The continuous filling of the mixing chamber 54 with carrier liquid 16 pushes the organic non-aqueous phase of the solvent/extractant liquid 44 with the portion of sample liquid 48 extracted therein out of the phase separator 52. At this point, phase separation is complete. The solvent/extractant liquid 44 having a portion of the sample liquid 48 extracted therein, then exits the mixing device 10 through tubing 88 and is then vented to a post extraction reaction system or detector (not shown).

A conductivity sensor 90 is located at the top 92 of the mixing chamber 10, and is activated to sense when the solvent/extractant liquid 44, (having the portion of sample liquid 48 extracted therein), is completely pumped out of the mixing device 10. This is done by sensing the conductivity of the carrier liquid 16. Because the carrier liquid 16 is of a higher density and remains beneath the organic non-aqueous phase of solvent/extractant liquid 44, when the conductivity sensor 90 senses the known conductivity of the carrier liquid 16, it is also known that solvent/extractant liquid 44 is completely out of mixing device 10. When the conductivity sensor 90 senses the carrier liquid 16, the system is deactivated, thereby prohibiting the carrier liquid 16 from contaminating the organic nonaqueous phase of the solvent/extractant liquid 44.

When the above described extraction cycle is completed, the mixing device 10 is then flushed clean by switching the two way rotary valve 23 to connect conduit 18 through outlets 21 and 25 to conduit 93 through outlet 27. Conduit 93 is connected to flush loop 95 through which water or some other suitable flushing liquid 97 continuously flows to waste drain 99. Pump 24 is then reversed to pump all of the contents of the mixing chamber 54 into flush loop 95. If it is deemed desirable to flush the system, pump 24 is reversed again to fill mixing chamber 54 and all intermediate conduits with flush liquid 97 after which pump 54 is reversed again to exhaust the rinse/flush liquid back into flush loop 95. A new extraction cycle may be initiated by switching the two way rotary valve 23 to connect conduit 18 through outlet 25 to conduit 18 through 20 and reversing pump 24.

The entire process described above including timing means and activation and deactivation of the various components, may be operated by a sequence programmer or programmable controller or similar automatic controlling apparatus.

In the preferred embodiments, the batch extraction analysis system 1 of the present invention is used to extract uranium from an aluminum nitrate salting solution into hexone. In such an embodiment, the carrier liquid 16 comprises aluminum nitrate, the solvent/extractant liquid 44 comprises hexone or a similar hydrocarbon solvent, and the aqueous sample liquid 48 comprises a uranium solution. The impure uranium sample solution combines immediately with the aluminum nitrate, both being aqueous, to form a first liquid, but they do not immediately mix with the non-aqueous hexone, which represents the second liquid. As the magnetic stirring bar 66 begins to vigorously mix the two liquids, molecules of nitrate from the aluminum nitrate combine and attach to molecules of pure uranium from the impure uranium solution, and the combined molecules are then enabled to be chemically extracted into the hexone. Nitrate by itself is not extractable into hexone and uranium by itself is not extractable into hexone. However, when the nitrate and uranium molecules combine, this combination allows for extraction into the non-aqueous hexone. The impurities in the uranium solution remain in the aqueous phase as the pure uranium is extracted into the non-aqueous phase. As the extraction and phase separation is complete, the hexone, having pure uranium therein, is pumped from the mixing chamber 10 into a post extraction reaction system.

The batch extraction analysis system 1 of the present invention has also been tested with satisfaction using thiocyanate as the aqueous carrier liquid, hexone or a similar hydrocarbon solvent as the solvent/extractant liquid and cobalt as the sample liquid.

It is anticipated that other useful extractions may be accomplished with the batch extraction analysis system of the present invention. Examples of such include analytical applications in which the heavier phase extracts the analyte component from a lighter phase (requiring the extracted analyte to be collected from the bottom of the mixing chamber), and in which both liquid phases are continuously feeding into the mixing chamber with subsequent collection of the lighter phase from the top and the heavier phase from the bottom. In the continuous mode, this system can be used in non-analytical application to remove contained waste from a solvent for eventual recycle of the original solvent.

The foregoing description and drawings merely explain and illustrate the invention, and the invention is not limited thereto, except insofar as those who have the disclosure before them are able to make modifications and variations therein without departing from the scope of the invention.

The embodiment of the invention in which an exclusive property or privilege is claimed is defined as follows:

1. A method for extracting uranium from an aluminum nitrate salting solution comprising the steps of:

pumping a carrier stream of aluminum nitrate through first and second sampling injection valves and into a mixing device;

injecting an aliquot of low-density, water-immiscible, hexone as a solvent-extractant from said first sampling injection valve into the first portion of said carrier stream;

subsequently injecting an aliquot of impure uranium solution from said second sampling injection valve into said carrier stream, wherein said hexone and said impure uranium solutions are conveyed into said mixing device by said carrier stream;

vigorously mixing said hexone with said uranium and aluminum nitrate solution in the lower portion of said mixing device with a magnetic stirring bar;

continuously and gradually filling said mixing device with said aluminum nitrate during said vigorous mixing;

chemically extracting molecules of pure uranium combined with molecules of nitrate into said hexone during said vigorous mixing;

separating said hexone having pure uranium therein from said aluminum nitrate having impurities therein by allowing said hexone to float to the top of the upper portion of said mixing device; and forcing said separated hexone with said pure uranium therein out of the top of said mixing device by said continuous filling of said mixing device with said aluminum nitrate.

2. The method as described in claim 1, wherein said mixing device comprises an upper portion and a lower portion wherein said lower portion comprises a cylindrical mixing chamber having an inlet and magnetic stirbar proximate the bottom thereof and having a plurality of grooves cut into the interior walls thereof for aiding said mixing and wherein said upper portion comprises a substantially conical separator having upwardly angled walls and an outlet at the top thereof.

3. The method of claim 1, wherein said uranium changes from an initially impure aqueous phase into a pure organic non-aqueous phase.

4. The method of claim 1, wherein said method further comprises the steps of:

sensing the conductivity of said aluminum nitrate having impurities therein as it exits said mixing device; and ceasing the operation of said extraction upon said sensing, thereby inhibiting the contamination of said pure uranium which first exits said mixing device.

5. A method for extracting a component of a first aqueous liquid into a second non-aqueous liquid comprising the steps of:

continuously flowing a stream of said first aqueous liquid into a mixing device;

introducing said second non-aqueous liquid comprising a non-aqueous solvent-extractant into said stream of said first aqueous liquid;

introducing an aqueous sample into said stream;

flowing said non-aqueous solvent extractant and said aqueous sample into said mixing device along with said first aqueous liquid;

combining said first aqueous liquid with said aqueous sample, thereby forming an aqueous mixture;

vigorously mixing said aqueous mixture with said second non-aqueous liquid in said mixing device while continuously filling said mixing device with said first aqueous liquid;

chemically extracting a component of said first aqueous liquid into said second non-aqueous liquid during said vigorous mixing;

separating said second non-aqueous liquid from said first aqueous liquid by allowing said second non-aqueous liquid to rise to the top of said mixing device;

forcing said second non-aqueous liquid out the top of said mixing device by said continuous filling of said mixing device with said first aqueous liquid; and flushing said mixing device by pumping said liquids from said mixing chamber to a drain.

6. The method of claim 5, wherein said stream of aqueous carrier liquid is acid-deficient aluminum nitrate, said aqueous multi-component sample is impure uranium solution and said second liquid is hexone.

7. The method of claim 5, wherein said method is controlled by sequence timing means.

8. The method of claim 5, wherein said second liquid is of a lighter density than said aqueous carrier liquid.

9. The method of claim 5, wherein said method further comprises sensing the conductivity of said first liquid as it exits said mixing device and ceasing the operation of said extraction upon said sensing, thereby inhibiting the contamination of said second liquid which first exits said mixing device.

10. An apparatus for extracting a component of a first liquid into a second liquid which is a solvent for a component of said first liquid and is immiscible with said first liquid, and for separating said second liquid from said first liquid subsequent to said extraction, said apparatus comprising:

a mixing device having an upper portion and a lower portion;

means for supplying a first portion of said first liquid into said mixing device at a substantially constant flow rate while said apparatus is in operation;

means for injecting said second liquid into said first portion of said first liquid wherein said second liquid is carried into said mixing device;

means for injecting a second portion of said first liquid into said first portion of said first liquid wherein said second portion is carried into said mixing device; and said lower portion of said mixing device comprising a mixing chamber having an inlet through which said mixing chamber is filled with said first and second liquids and mixing means for vigorously mixing said first and second liquids, whereby a component of said first liquid is extracted into said second liquid during said vigorous mixing; and wherein said upper portion of said mixing device comprises a separator for aiding the natural separation of said second liquid from said first liquid subsequent to said extraction, and an outlet through which said second liquid is removed subsequent to said separation.

11. The apparatus of claim 10, wherein said means for supplying a first portion comprises a pump which pumps said first portion of said first liquid from an external source through said inlet into said lower portion of said mixing device, remove liquids from mixing device, and fills and empties mixing device with said flushing solution.

12. The apparatus of claim 10, wherein said means for injecting said second liquid and said means for injecting a second portion of said first liquid comprise individual injection valves respectively.

13. The apparatus of claim 10, wherein said lower portion of said mixing device is substantially cylindrical, and has a plurality of grooves cut into the interior walls thereof so as to aid in the thorough mixing of said first and second liquids.

14. The apparatus of claim 10, wherein said upper portion of said mixing device is substantially conical in shape and has upwardly tapered walls for aiding the separation of said first and second liquids.

15. The apparatus of claim 10, wherein said mixing device is constructed of polytetrafluoroethylene.

16. The apparatus of claim 10, wherein said apparatus further comprises a conductivity sensor for sensing when said first liquid begins to exit said mixing device.

17. The apparatus of claim 16, wherein said sensing ceases the operation of said apparatus so that said first liquid is inhibited from contaminating said second liquid subsequent to said extraction.

18. The apparatus of claim 10, wherein said mixing means comprises a magnetic stirbar.

* * * * *